April 1, 1958      A. S. HARBOUR      2,828,644
GEARSHIFT CONTROL

Filed Nov. 4, 1952      2 Sheets-Sheet 1

INVENTOR
Albert S. Harbour
BY
Willito Helwig & Baillio
ATTORNEYS

April 1, 1958  A. S. HARBOUR  2,828,644
GEARSHIFT CONTROL

Filed Nov. 4, 1952  2 Sheets-Sheet 2

INVENTOR
Albert S. Harbour
BY
Willis, Helmig & Baillio
ATTORNEYS

United States Patent Office 2,828,644
Patented Apr. 1, 1958

2,828,644
GEARSHIFT CONTROL

Albert S. Harbour, Pontiac, Mich., assignor to General Motors Corporation, Detroit, Mich., a corporation of Delaware Application November 4, 1952, Serial No. 318,695

1 Claim. (Cl. 74—484)

My invention relates to automotive transmission controls and more particularly to improved arrangements for transmission of control settings from a lever on the steering column of a motor vehicle to a transmission of the vehicle.

The principal objects of the invention are to provide improved control mechanisms of this sort, and to provide an arrangement which is strong, easy to manipulate, and convenient for assembly and service.

The control mechanism of this application is in some respects an improvement on that described and claimed in the copending application of Albert S. Harbour and Albert E. Leach entitled Transmission Control, Serial No. 318,694, filed November 4, 1952.

The nature of the invention and the objects and advantages thereof will be better understood by reference to the accompanying drawings in which.

It is believed unnecessary to illustrate the general arrangement of the transmission and steering column in a conventional motor vehicle, which may be as described in the above-mentioned application. The steering column 14 supported on the frame mounts at its upper end a steering wheel (not shown) and a transmission control lever 17. The gearbox (not shown) of the vehicle may be of the known selective sliding gear type with three speeds forward and one speed in reverse, controlled by a shifter lever and a selector lever. The selector lever selects the shifter fork to which the shift lever is connected, so as to shift between reverse and first gear or between second and third gears. The embodiment of the invention illustrated in Figs. 1 to 4 provides for the control of such a gearbox by rotary motion of the lever 17 about the steering column axis and vertical movement of the lever in the conventional H-shift.

Figure 1:
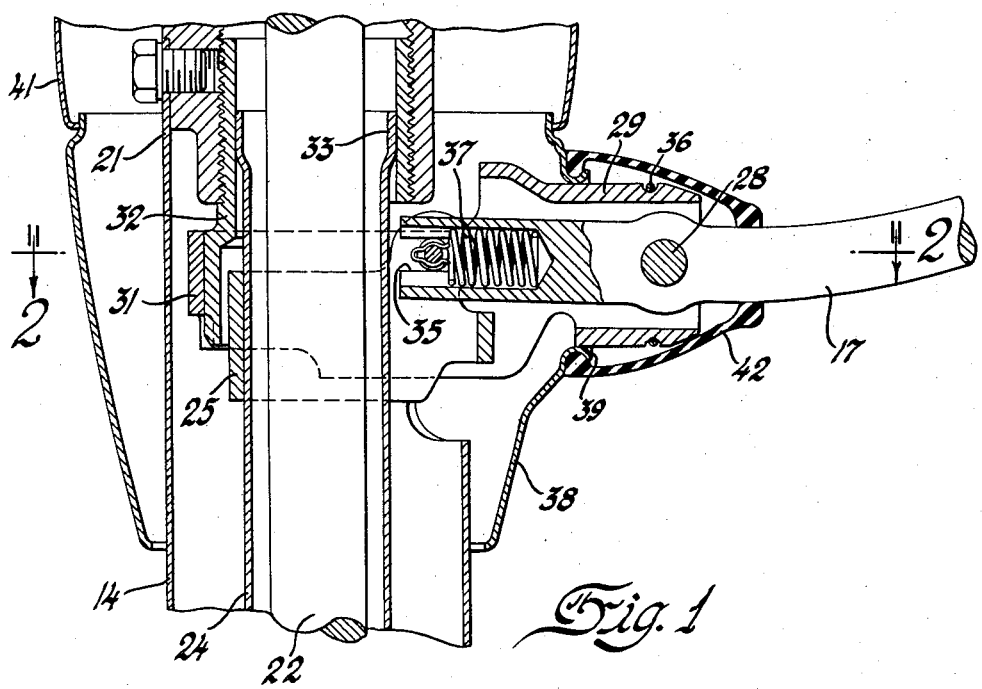
Fig. 1 is a view, principally in section on a plane containing the axis of the steering column, illustrating the mechanism at the upper end of the column.
Figure 2:
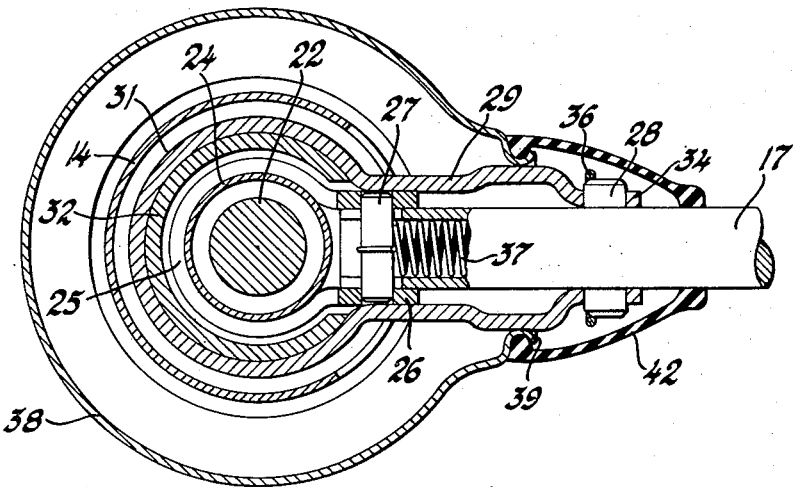
Fig. 2 is a transverse sectional view taken on the plane indicated in Fig. 1.
Figure 3:
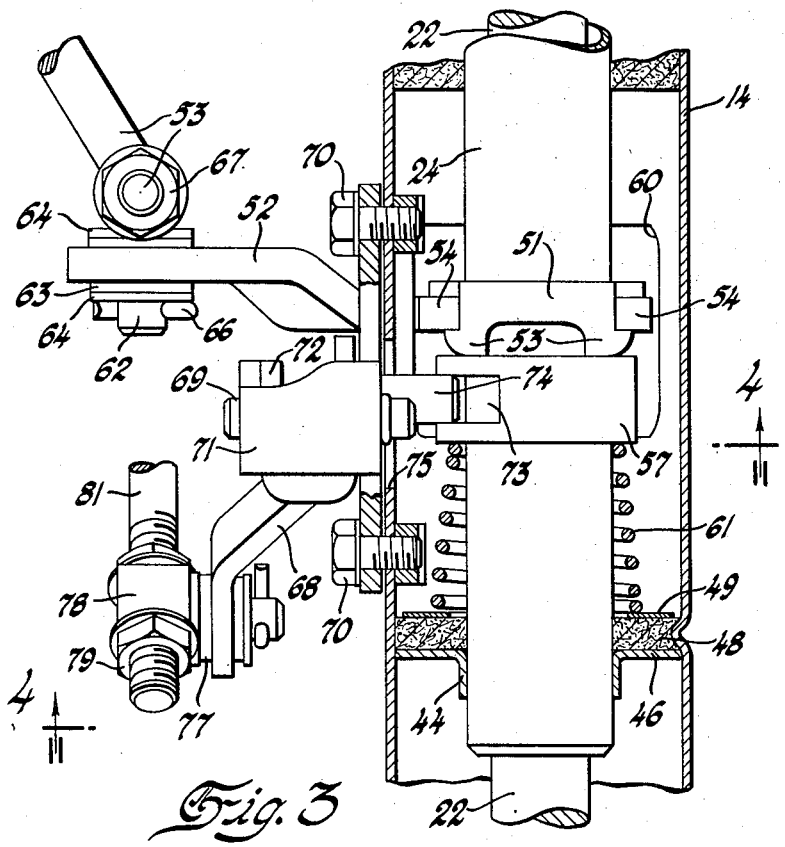
Fig. 3 is a view taken on a plane parallel to the axis of the steering column showing the shift control mechanism adjacent the lower end thereof.
Figure 4:
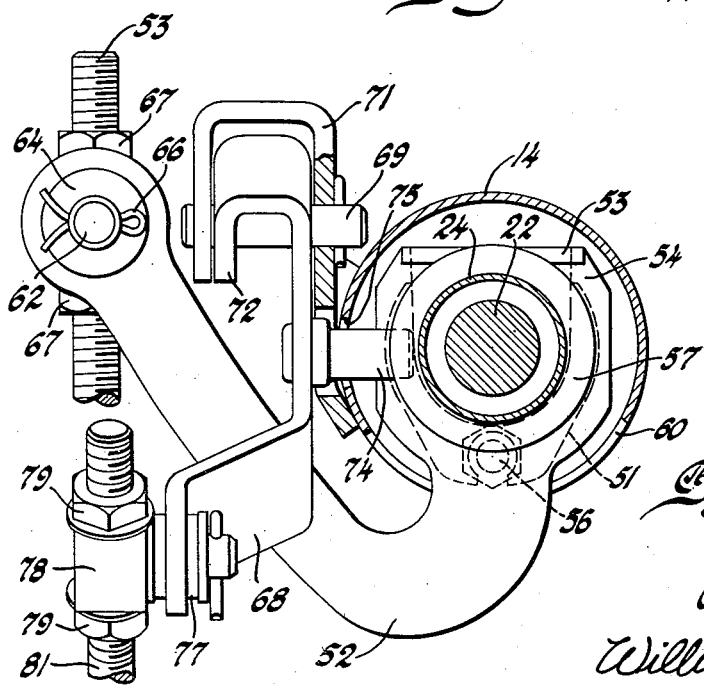
Fig. 4 is a cross-sectional view taken on the plane indicated in Fig. 3.

Referring to Figs. 1 and 2, the tubular steering column 14 mounts at its upper end a bearing support 21 in which the upper end of the steering shaft 22 is supported by a bearing (not shown). The steering wheel may be mounted on the upper end of the shaft 22 by conventional means. The transmission control movements are transmitted by a control tube 24 which may rotate about the axis of the steering shaft and reciprocate along the axis of the shaft. Brazed to the upper portion of the control tube is a generally U-shaped fitting 25 including two ears 26 defining a fork across which extends a pin 27 by which the control tube is connected for longitudinal movement to the manually operated lever 17. The lever 17 is fulcrumed on a pin or shaft 28 mounted in a generally tubular formed metal bracket 29, which bracket includes a strap portion 31 which extends around and is brazed or otherwise fixed to a sleeve 32. The upper end of the control tube 24 is flared as indicated at 33 so that it is guided within the sleeve 32. As will be apparent, rotation of the lever 17 in the plane of Fig. 1 about the fulcrum 28 will raise and lower the control tube 24. As will be more clearly apparent from Fig. 2, rotation of the lever 17 in the plane of that figure will rotate the bracket 29, 31, sleeve 32, fitting 25, and control tube 24 about the axis of the steering shaft 22.

Referring more particularly to Fig. 2, it will be noted that the control lever 17, which is preferably of generally rectangular cross section at the fulcrum 28, is closely embraced by the forks 34 of the bracket 29. Likewise, the ears 26 are guided closely for sliding movement between the sides of the bracket 29, and the inner end of the lever 17, the sides of which are clevised as indicated at 35 to embrace the pin 27, is mounted with only operating clearance between the ears 26. It will be noted that the pin 27 is retained by the bracket 29 and the pin 28 by a snap ring 36. A compression spring 37 mounted between the pin 27 and the bottom of a hole in the end of the lever 17 acts to prevent ratting of the parts. As will be apparent, the arrangement of the lever 17, bracket 29, and fitting 25 insure accurate rotational movement of the tube 24 in accordance with rotation of the lever 17 about the steering column axis.

The mechanism just described may be enclosed in a concealing housing of attractive form which may comprise a generally conical lower portion 38 formed with a flanged opening 39 for the fulcrum bracket 29, and an upper shell or shells 41 between the shell 38 and the steering wheel, the shells 41 being fixed in suitable manner on the column 14. These housings may enclose other mechanisms such as turn signal switches and the like which are not illustrated, since they are not material to the invention which is the subject of this application. A flexible thimble 42 of rubber or the like fits over the lever 14 and is mounted on the flange 39 of the housing 38.

As will be understood, the steering shaft 22 extends through the steering column 14 to a steering mechanism which is not illustrated, being immaterial to the present invention, and the control tube 24 extends to a point near the lower end of the steering column where it is supported in a bearing sleeve 44 (Fig. 3) which is integral with a flange 46 suitably supported in the column 14. An oil soaked felt washer 48 mounted between the flange 46 and a metal washer 49 serves as a seal and to provide lubrication for the bearing 44. A collar or key 51, welded to the tube 24, provides a mounting for the shifter arm 52 which is connected by a rod 53 to the shifter lever of the transmission.

The collar 51 is roughly circular and is bent downwardly on the forward edge at 53. The arm 52 is made with a forked end which straddles the tube 24 and the end portions 54 of which straddle the bent-down part 53 of the collar 51. A capscrew 56 passing through a hole in the collar 51 and threaded into a tapped hole in the arm 52 holds the arm in place on the collar. It will be seen that the arm is thus easily assembled to the tube.

A compression spring 61 mounted between a second collar 57 on shaft 24 and washer 49 supports the control tube 24. The shift control arm 52 extends from the rear or lower side of the steering column through an opening 60 and curves around in approximately a semicircle so that its outer end is abreast of the right side of the column. A trunnion fitting 62 is supported in the outer end of the arm by a resilient grommet 63, washers 64, and a cotter key 66 on the stem of the trunnion fitting extending through the grommet 63. The forward end of the rod 53 extends through the barrel of the fitting 62 and may be adjusted therein by nuts 67 threaded on the end of the rod. As will be apparent, rotation of the shift lever 17 around the axis of the column is transmitted through the tube 24 to the lever 52 which reciprocates the rod 53 to rotate the shifter lever of the transmission.

Motion of the control tube 24 longitudinally of the steering column actuates a selector control arm 68 rotatably mounted on a pin 69 extending at right angles to the axis of the steering column and offset from the said axis. The pin 69 is mounted in the recurved end of a bracket 71 fixed on the column 14 by capscrews 70. The end of the arm 68 which is supported on the pin 69 is recurved as indicated at 72 to provide two bearing surfaces, one adjacent each mounting point of the pin 69.

The arm 68 is rotated about its fulcrum on the pin 69 by the collar 57 welded or otherwise fixed on the control shaft 24, which is formed with a circumferential groove 73 defining two shoulders between which fits the end of a pin 74 fixed on the arm 68 and extending through an opening 75 in the steering column 14. The groove 73 is of sufficient arcuate extent to provide for the desired rotation of the control shaft. The outer end of arm 68 is provided with a hole for a grommet 77 by means of which a trunnion fitting 78 is mounted on the arm. The trunnion fitting 78 may be identical to the fitting 62 and is adjustably connected by means of nuts 79 to the selector rod 81 which connects to the selector lever of the transmission. As will be apparent, therefore, movement of the lever 17 toward or away from the steering wheel through vertical movement of control tube 24 and lever 52 rocks lever 68 to select the desired range in the transmission.

It will be seen from the foregoing that the described embodiment of the invention provides a very simple, rugged mechanism free from unnecessary friction, easy to assemble, disassemble, and adjust and, in general, extremely well suited to the requirements of a motor vehicle installation for effecting the control of a transmission from a hand lever on the steering column.

The detailed description herein of the preferred embodiment of the invention, for the purpose of explaining the principles thereof, is not to be considered as restricting or limiting the invention.

I claim:

In a transmission control mechanism for an automobile vehicle or the like, in combination, a steering column, a steering shaft spaced within the steering column, a control tube spaced within the steering column and encircling the steering shaft, a fitting at the upper end of the steering column, a bracket spaced within the steering column and encircling the control tube, the bracket having an upper cylindrical portion and a U-shaped lower arm portion, connecting means between the fitting and the cylindrical portion of the bracket for rotatably supporting the bracket about the steering shaft, the upper end of the control tube being reciprocably and rotatably engaged within the cylindrical portion of the bracket, a U-shaped member secured on the control tube adjacent and below the upper end thereof and positioned within the U-shaped portion of the bracket, a control lever extending into the U-shaped portion of the bracket and into the U-shaped member, a pivot connection between the U-shaped portion of the bracket and the control lever for up and down swinging movement of the control lever, a slidable pivot connection between the end of the control lever and the U-shaped member whereby up and down swinging movement of the control lever will reciprocate the control tube longitudinally of the steering column, the control lever and the U-shaped member and the U-shaped portion of the bracket being in local engagement with each other whereby back and forth swinging movement of the control lever will rotate them as a unit about the steering shaft.

References Cited in the file of this patent
UNITED STATES PATENTS

| | | |
|---|---|---|
| 2,235,975 | Best | Mar. 25, 1941 |
| 2,282,962 | Hawkins | May 12, 1942 |
| 2,377,700 | Kurtz | June 5, 1945 |
| 2,638,013 | Dodt | May 12, 1953 |
| 2,693,713 | Reid et al. | Nov. 9, 1954 |
| 2,696,126 | Lincoln | Dec. 7, 1954 |